United States Patent [19]

Dillon et al.

[11] Patent Number: 5,778,826
[45] Date of Patent: Jul. 14, 1998

[54] BIRD AND ANIMAL BLINDFOLDING APPARATUS

[76] Inventors: William W. Dillon, P.O. Box 432; James Michael Dillon, P.O. Box 333, both of Walsh, Colo. 81090; Russell Allen Dillon, P.O. Box 3328, Stinnett, Tex. 79083

[21] Appl. No.: 790,421

[22] Filed: Jan. 30, 1997

[51] Int. Cl.$^6$ .................................................. A01K 15/00
[52] U.S. Cl. .......................... 119/717; 119/802; D30/151; D30/162; D30/199
[58] Field of Search .................................. 119/801, 802, 119/713, 717, 853; 294/1.4, 1.5; D30/144, 151, 162, 199; 43/7, 11, 137

[56] References Cited

U.S. PATENT DOCUMENTS 918,613  4/1909  Upton .................................. 119/717
3,872,834  3/1975  Fuhrman .............................. 119/801
4,103,953  8/1978  Lachance ............................. 294/1.4
4,852,924  8/1989  Ines ................................... 294/1.5

FOREIGN PATENT DOCUMENTS 291 911 A5  7/1991  Germany .............................. 119/713

Primary Examiner—John S. Hilten
Assistant Examiner—Amanda B. Sandusky
Attorney, Agent, or Firm—Richard W. Hanes

[57] ABSTRACT

Apparatus for blindfolding a bird, comprising an elongated handle, a deformable split ring attached to the handle, where the ring includes at least one peripheral flange, and a pliant hood, having an opening in one end thereof, detachably mounted around the circumference of the split ring and where the perimeter of the hood's opening is elastic and is adapted to fit under the peripheral flange.

4 Claims, 3 Drawing Sheets

BIRD AND ANIMAL BLINDFOLDING APPARATUS

The present invention relates generally to apparatus for blindfolding a ratite bird such as an ostrich, emu or rhea, or any type of animal, for the purpose of establishing control of the bird or animal when handling, directing or loading.

BACKGROUND

Handling and directing the movements of any one of the species of large flightless ratite birds such as emu, ostrich or rhea is a difficult and time consuming endeavor if injury to the bird is to be avoided. The necessary close confrontation of the birds for such purposes produces frenzied, wild and disorderly conduct on their part, making control and direction difficult.

It has been found, however, that by blindfolding the birds, their agitated activity is substantially subdued and a handler is able to more easily direct and control their movement, making capture, direction and loading less time consuming and reducing the risk of injury to the birds.

The known prior art does not disclose an article similar to the one of the present invention. U.S. Pat. No 4,594,966 illustrates a collapsible head covering for animals which has a purpose similar to that of the hood of the present invention, however the head covering of the '966 patent is emplaced entirely by hand.

U.S. Pat. No. 3,872,834 discloses an animal capturing and restraining device having an elongated handle and a pair of diverging rods which hold open one end of a hood into which the animal to be captured enters. Neither of these devices would serve the purpose of the present invention.

It is therefore the primary object of the present invention to provide apparatus which will quickly and easily blindfold a bird of the type described by placing a hood over the head of the bird.

A second object of the invention is to provide a blindfolding apparatus which is functional without the operator touching, restraining or capturing the bird to which the blindfold is to be applied.

Other and further objects, features and advantages of the invention will become apparent upon a reading of the following detailed description of the invention, taken in conjunction with the accompanying drawings.

DETAILED DESCRIPTION

Figure 3:
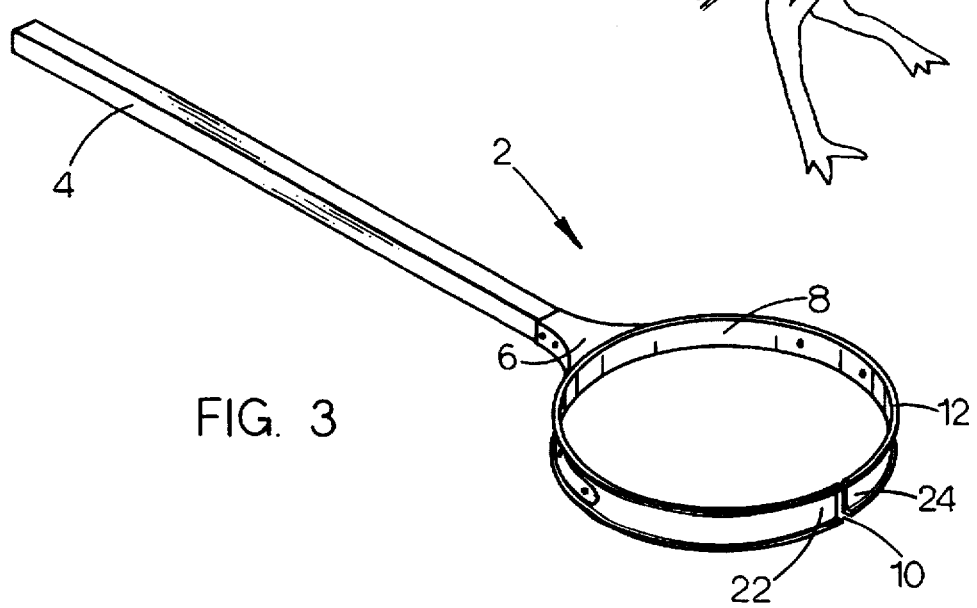
FIG. 3 is an enlarged perspective view of the application frame of the present invention.
Figure 4:
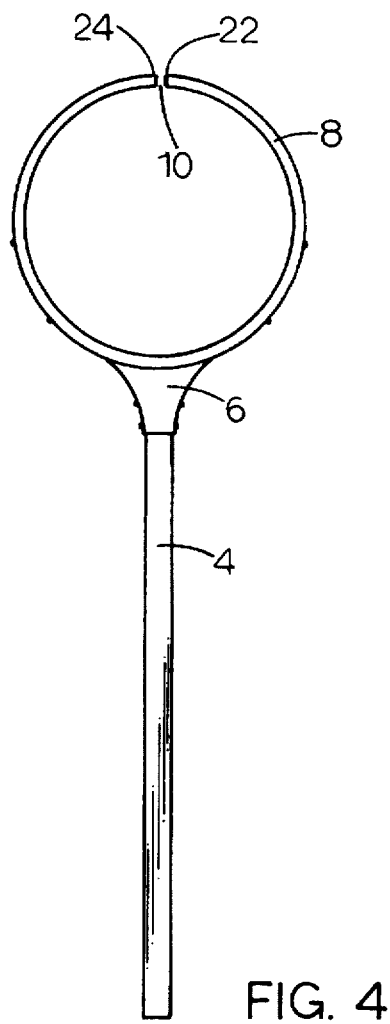
FIG. 4 is a top plan view of the frame.

Referring first to FIG. 3, the application frame 2 of the present invention is shown. The frame is referred to as an application frame because it is the device by which the blindfolding hood is applied to the head and neck of the bird. An elongated handle 4 is attached with a "Y" shaped mounting bracket 6 to a deformable split circular ring 8. The ring is preferably constructed of plastic. A thin section of about one inch of a ten inch diameter PVC pipe, or an equivalent material, will function satisfactorily for the purpose of the invention. The ring is cut or separated at some selected point in its circumference, at which the ring is not adjacent to the bracket 6 or handle 4, to form a split 10 in the ring. The split 10 in the embodiment shown in the drawings is positioned diametrically across the ring from the attaching end of the handle 4, but that positioning is not critical. The position of the split should provide adequate flexibility of the ring in order to permit enlargement of the split opening, so as to permit a birds neck to pass through the enlarged split opening, as will be subsequently explained.

Figure 5:
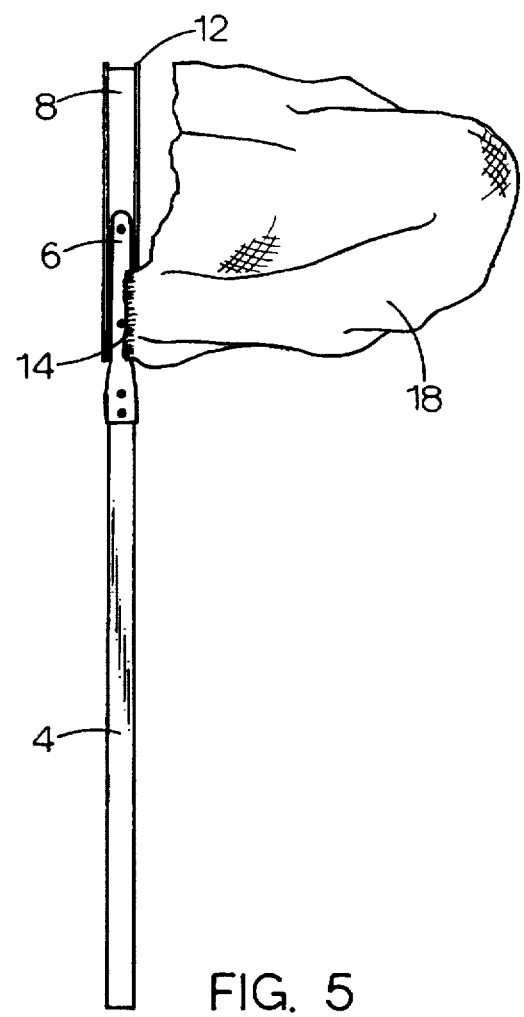
FIG. 5 is a side view of the frame, with a fragmentary side view of the blindfolding hood, as mounted on the frame.
Figure 6:
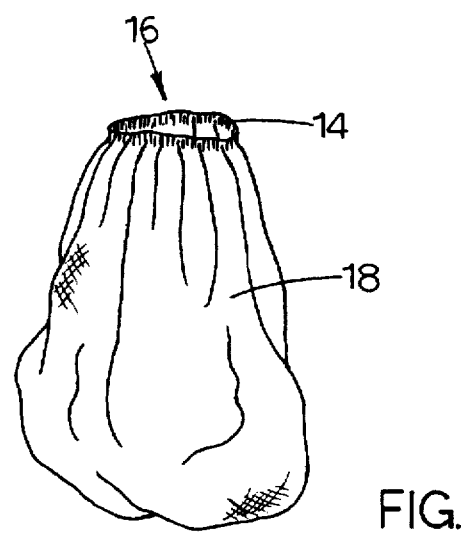
FIG. 6 is a perspective view of the blindfolding hood to be used with and mounted on the frame of FIGS. 3–5.

At least on one of the peripheries of the ring 8 a flange 12 is formed which is perpendicular to the side of the ring and parallel with the plane of the ring. The flange 12 retains the elasticized perimeter 14 of the opening 16 in one end of the hood 18. The hood may be made of any convenient material, such as fabric, leather or plastic. Preferably, the material should be opaque so that when the hood is placed over the head of a bird 20, such as an emu, ostrich, or rhea, the bird will not be able to see through the walls of the hood and will be essentially blindfolded. The perimeter 14 of the opening in the hood can be made elastic in any number of ways, known to the sewing art. For example, the cloth hood of the preferred embodiment contains an endless loop of elastic banding, or cord, housed inside the hemmed edge of the cloth material comprising the hood. The sizing and dimensioning of the elastic perimeter is such that the opening of the hood will fit around the circumference of the ring 8 and the flange 12, as shown in FIG. 5, when the elastic band within the hem is stretched. The hemmed portion of the hood, including the interior elastic band, is disposed under the flange 12 to retain the opening 14 of the hood around the split ring.

Figure 1:
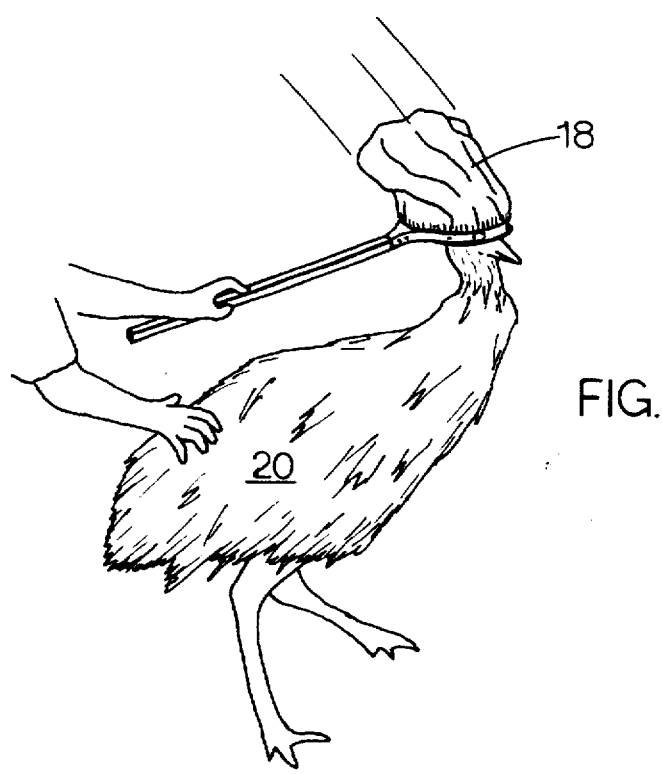
FIG. 1 is a perspective view of the application frame of the present invention, together with the blindfolding hood, in the act of being placed over the head and neck of a bird.

With the hood 18 mounted on the split ring 8, as shown in FIGS. 5 and 1, the bird handler can thrust the hood over the head of the bird 20 with a swift downward movement of the handle and ring. Continued downward movement of the handle and attached split ring past the point where the bottom of the hood has contacted the top of the bird's head will serve to dislodge the elastic perimeter from its normally confined position beneath the flange, thus separating the hood from the split ring. When freed from the ring, the stretched elastic perimeter 14 of the hood 18 tends to close around the neck of the bird, serving to retain the hood on the birds head.

Figure 2:
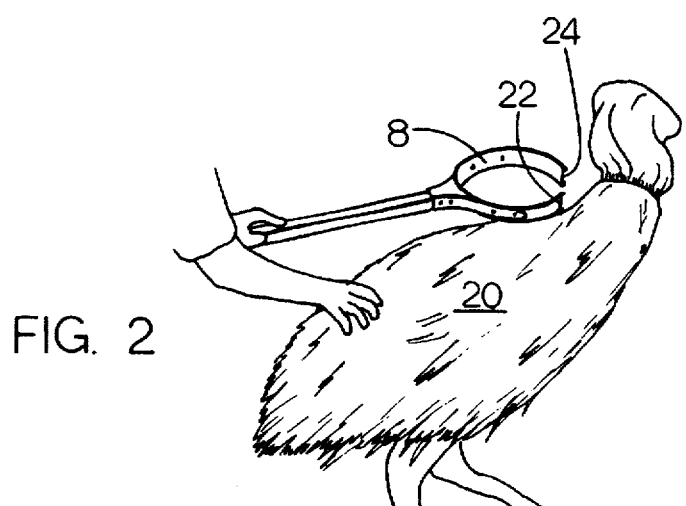
FIG. 2 is a perspective view of the application frame being removed from the neck of a bird upon whose head the blindfolding hood has been placed.
Figure 7:
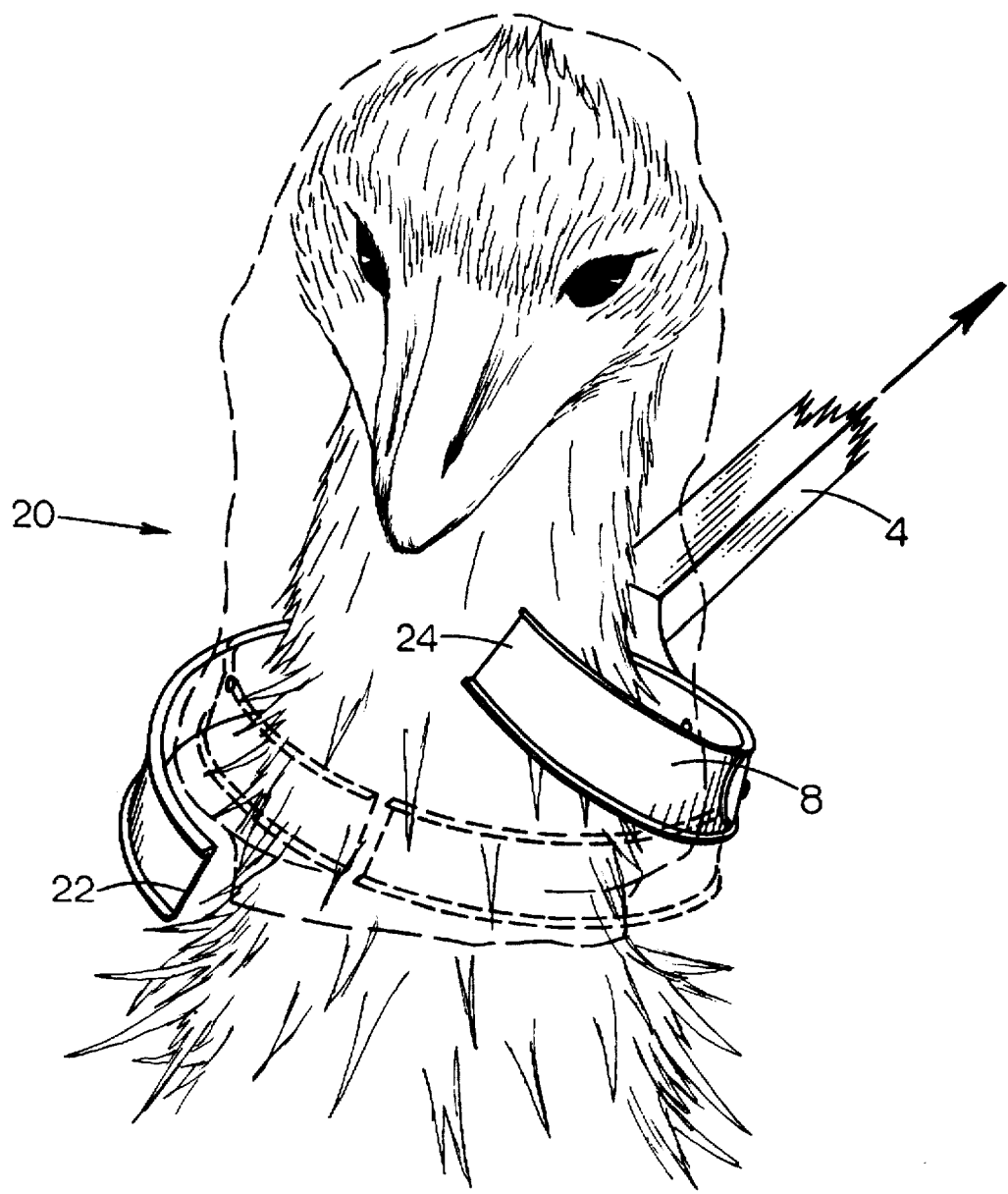
FIG. 7 is a perspective view of a bird's head, without the blindfolding bag in place, but showing in greater detail than FIG. 2 how the ring is separated when pulled from the bird's neck, so as to separate at the split, allowing the neck of the bird to pass easily through the opening formed between the ends at the ring.

Immediately upon separation of the hood from the split ring, the handler pulls the ring sideways, as shown in FIGS. 2 and 7. The sideways movement of the ring causes the birds neck to force the split defining ends 22 and 24 of the ring to separate, by bending and/or twisting the two ring sections, enlarging the split to a dimension sufficient for the birds neck to pass through. In one easy and swift motion, the hood is securely placed on the bird's head and the frame is removed sideways, without taking it back over the head of the bird and without damage, injury or trauma to the bird.

When selecting the material for the split ring the criteria is simple. The ring must be rigid enough to hold open the opening in one end of the hood. The ring material must have sufficient flexibility in accommodating bending and twisting forces that the split will be enlarged sufficiently so that the bird's neck will pass through the enlarged split without injuring the bird. The flexibility should be such that the ends 22 and 24 can separate a distance of approximately the radius of the ring, however that is not a critical measurement. The diameter of the ring should be sufficient to easily fit over a bird's head, with some room to spare.

In the embodiment shown and described the handle 4 is straight and the split ring 8 is coplanar with the handle. However, the handle can be of any convenient shape and the ring can be attached to the handle in any manner which will allow for the easy application of the hood and the following disengagement of the split ring from the bird's neck, as shown in FIGS. 1 and 2 respectively. The preferred embodiment of the invention includes a circular split ring because it is simple to fabricate, however it is well within the scope of the invention to employ other shapes of rings, such as rectangles, ellipses and others.

We claim:

1. Apparatus for blindfolding a bird, comprising, an elongated handle, a deformable split ring attached to the handle, where said ring includes at least one peripheral flange, and a pliant hood, having an opening in one end thereof, detachably mounted around the circumference of the split ring, where the perimeter of the opening is elastic and is adapted to fit under the peripheral flange.

2. The combination of claim 1 where the perimeter of the opening is hemmed around an enclosed elastic cord which tends to contract and close the opening in the hood.

3. The combination of claim 2 where the split ring is coplanar with the elongated handle.

4. The combination of claim 3 where the split ring includes a pair of ends defining the split and where the split ring is sufficiently flexible, in accommodating bending and twisting forces, that the split ends may separate a distance equal to approximately the radius of the ring.

* * * * *